F. A. WHITAKER.
METHOD AND APPARATUS FOR TRIMMING IRRIGATION AND DRAINAGE DITCHES.
APPLICATION FILED OCT. 2, 1919.
1,351,014.
Patented Aug. 24, 1920.
2 SHEETS—SHEET 1.
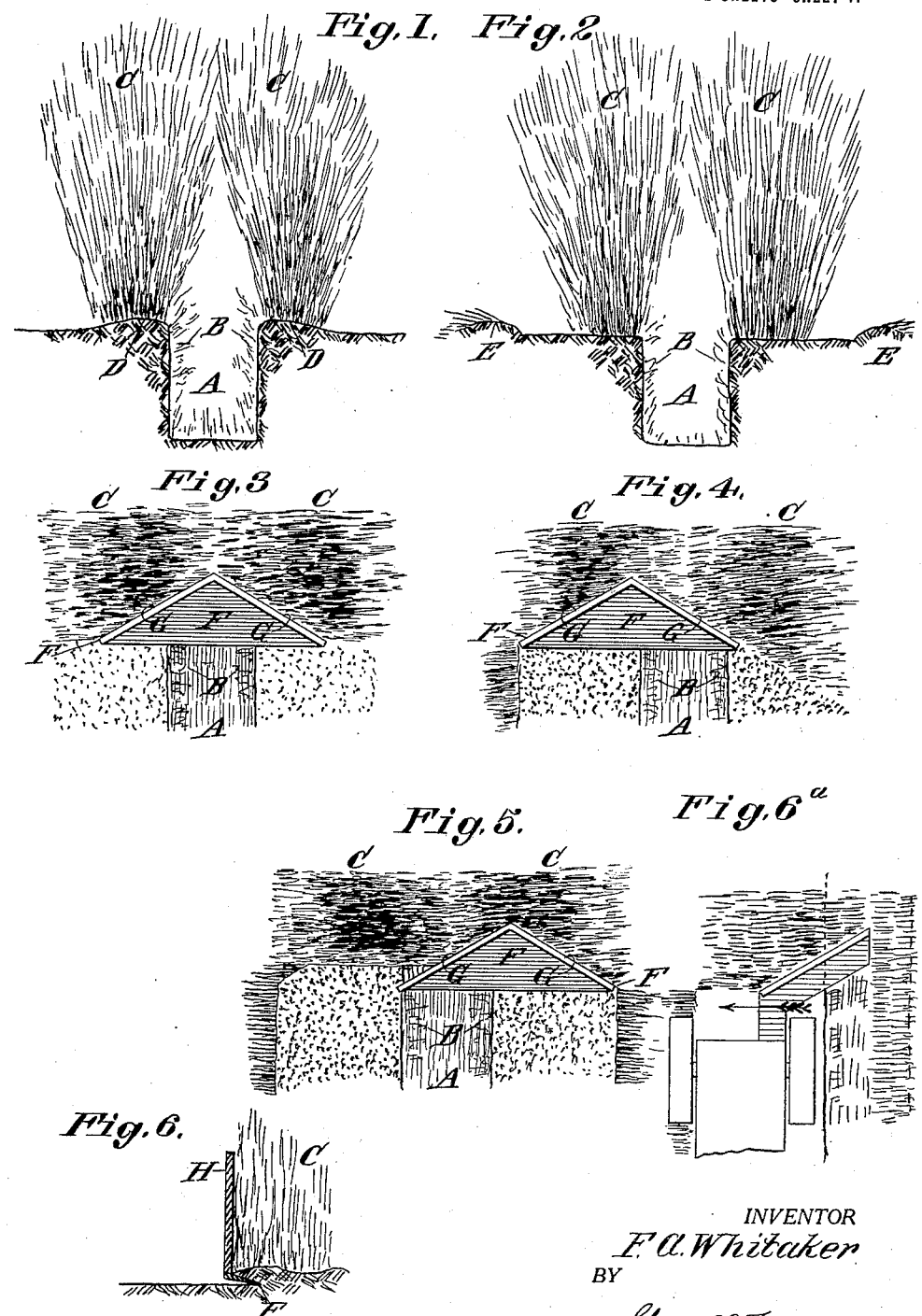
INVENTOR
F. A. Whitaker
BY
Strong & Townsend
ATTORNEYS F. A. WHITAKER.
METHOD AND APPARATUS FOR TRIMMING IRRIGATION AND DRAINAGE DITCHES.
APPLICATION FILED OCT. 2, 1919.
1,351,014.
Patented Aug. 24, 1920.
2 SHEETS—SHEET 2.
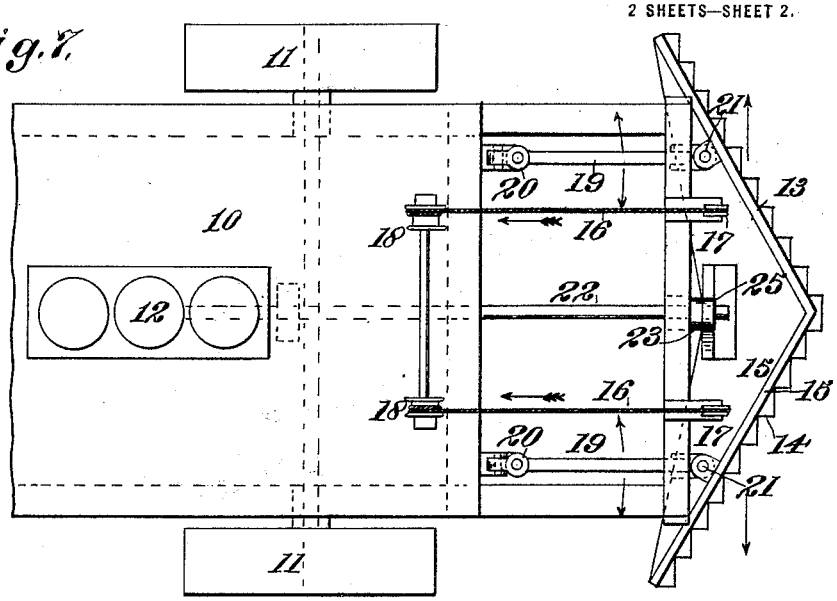
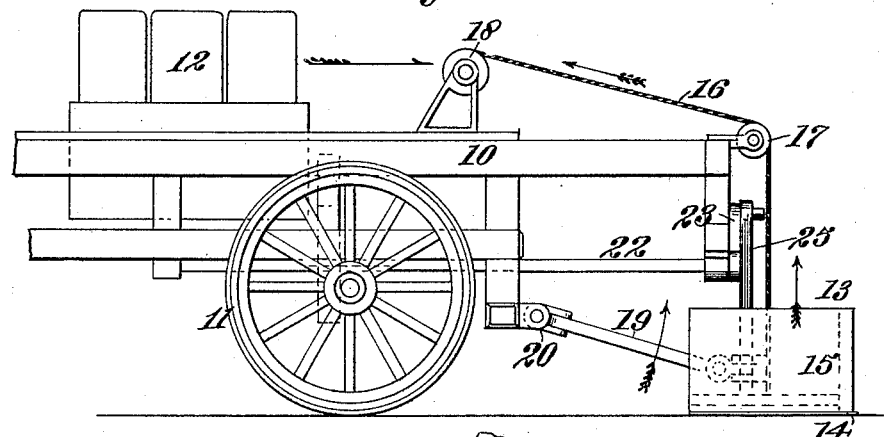
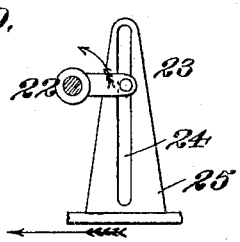
INVENTOR
F. A. Whitaker
BY
Strong & Townsend
ATTORNEYS

UNITED STATES PATENT OFFICE.

FLETCHER A. WHITAKER, OF STOCKTON, CALIFORNIA.

METHOD AND APPARATUS FOR TRIMMING IRRIGATION AND DRAINAGE DITCHES.

1,351,014.     Specification of Letters Patent.     Patented Aug. 24, 1920.

Application filed October 2, 1919. Serial No. 327,906.

*To all whom it may concern:*

Be it known that I, FLETCHER A. WHITAKER, a citizen of the United States, residing at Stockton, in the county of San Joaquin and State of California, have invented new and useful Improvements in Methods and Apparatus for Trimming Irrigation and Drainage Ditches, of which the following is a specification.

This invention relates to a method and apparatus for trimming weeds and other growth in and around ditches used for drainage or irrigation for the purpose of restoring such ditches to the condition where they will function efficiently.

With the ordinary cultivator it is impossible to approach closely a ditch of this character with the result that the weed growth in and around the ditch becomes considerable. In some sections of the country these weeds have a sturdy stalk and attain a height of six or eight feet. Ordinarily, the larger and higher weeds are at either side of the ditch, thus making it difficult to gain access to the ditch for the purpose of cleaning out small growth and deposits therein which tend to fill and dam the ditch. Several obstacles stand in the way of cutting such weeds by ordinary methods, as with a hand cutter or mower. There is the large size and difficult character of the weeds; also the location of the weeds. In cutting them with ordinary means they will fall into the ditch and obstruct the channel. Considerable labor would then be required to remove these weeds from the ditch. The unevenness of the ground adjacent the ditch makes cutting difficult and well nigh impossible with the ordinary machine, such as a mower.

In the present invention I employ a method and means whereby the weeds at each side are cut and thrown away from the ditch, falling clear to one side and leaving the ditch exposed so that the small growth and deposit within the ditch may readily be removed by the use of a shovel. The trimming machine employed preferably comprises a laterally reciprocating cutter which cuts alternately at opposite sides of the ditch, throwing the weeds so cut away from the ditch. This cutter is adjustable as to height, and is preferably such that it can pass readily through hills or mounds of earth for the purpose of leveling up the ground adjacent the ditch.

In the accompanying drawings, I have shown on Sheet 1 a diagram of the various steps employed in carrying out my invention.

Figure 1 shows a cross section of a ditch illustrating the growth of weeds within and at the sides thereof.

Fig. 2 shows a similar view, but indicating a different contour of the ground adjacent the ditch.

Fig. 3 shows a plan view of a ditch with my cutter or trimmer in a central position thereover.

Fig. 4 shows a view similar to Fig. 3 illustrating the cutter or trimmer in its extreme position to the left of the ditch.

Fig. 5 shows a similar view with the cutter at its other extreme position on the right-hand side of the ditch.

Fig. 6 shows a sectional view in elevation with the cutter passing through a hill or mound whereby the weeds are not only cut, but the ground leveled off.

In Sheet 2, Fig. 7 shows a plan view of a machine embodying my invention.

Fig. 8 shows a side elevation of the same.

Fig. 9 shows a fragmentary view in elevation illustrating the means for reciprocating the cutter.

Fig. 10 shows a fragmentary view in plan of the cutting member.

Referring more in detail to the accompanying drawings, a drainage or irrigation ditch is indicated by the reference character A. Small growth and deposits B are shown within the ditch. At either side of the ditch is a clump of weeds C. In Fig. 1 the sides of the ditch have hills or mounds D, caused usually by the throwing up of dirt by a cultivator. In Fig. 2, hills or mounds E of earth are shown at either side of the ditch but spaced a considerable distance therefrom. The purpose of these two illustrations is to indicate in a general way the varying condition of the ground adjacent the ditch, which is one of the reasons why ordinary cutting machines cannot be employed successfully for cutting or trimming the weeds around the ditch.

By the method herein disclosed I cut the weeds at each side of the ditch and throw them away from the ditch. This is done by using a cutter F which is shown in plan in Fig. 3 to be substantially triangular in shape with the two sides G provided with teeth, or otherwise prepared to act as cutters. This cutting mechanism is moved forward longitudinally of the ditch and simultaneously is reciprocated laterally thereof. In its initial position, as shown in Fig. 3, the apex of the triangle is placed over the center of the ditch. In moving to the left, as shown in Fig. 4, the cutting edge G will cut the weeds, and, by reason of upwardly extending sides H, the weeds so cut will be thrown away from the ditch. Thereafter the cutter is moved in the opposite direction, and in so moving the weeds on the right-hand side of the ditch will be cut and thrown away therefrom. It will be seen that upon each reciprocation a swath is cut equivalent in depth to the altitude of the triangular cutter. Also, as shown in Fig. 6, the cutting edges G are so constructed that they may pass through hills or mounds and act as levelers. After the cutting device has passed over the ditch the weeds at either side will have been cut and thrown in swaths away from the ditch, thus leaving the ditch exposed and easily accessible, so that one may readily and easily clean out the small growth and deposits B by means of an ordinary tool, such as a shovel, or other cleaning device.

The foregoing will serve to indicate in a general way the steps involved in trimming the weeds at either side of the ditch and the construction of the machine or apparatus in its present form will now be described. Referring to Sheet 2, it will be seen that the machine there illustrated comprises a suitable frame 10 carried upon wheels 11. The machine may be propelled in any suitable manner, but preferably carries an engine 12 for supplying power to reciprocate the cutting mechanism. At the forward end of the machine I arrange the cutting mechanism which comprises a blade 13 substantially triangular in plan with its apex pointing forwardly. Each side or leg of the triangle adjacent the base is provided with stepped or serrated cutters 14, and extending vertically upward from said cutters 14 is a shield or buffer 15. The whole cutting mechanism is suspended from the forward end of the main frame 10 by means of ropes 16 passing over sheaves or guides 17 and wound upon suitable drums or windlasses 18. Thrust links 19 are connected by universal joints 20 to the main frame and extend forwardly and have universal joint connections 21 with the cutting mechanism near the bottom of the latter. For reciprocating the cutting mechanism laterally I show a power shaft 22 extending forwardly from the engine 12 and operatively connected to the cutting mechanism by means of a crank arm 23 working in a vertical slot 24 formed in a standard 25 fixed to the bottom plate of the cutting mechanism.

In the operation of the device, the wheel carriage is propelled forwardly straddling a ditch and the cutting mechanism is reciprocated laterally by means of the power connections already described. In moving to the left from the center of the ditch the cutting edges on the left-hand side of the mechanism will act to cut the weeds and the upstanding shield or buffer on that side will insure that the weeds so cut will be thrown away from the ditch and piled in a swath or row clear to one side of the ditch. In traveling in the opposite direction the cutters on the left-hand side will in no wise function, but, at such time, the cutters on the right-hand side of the blade will serve to cut the weeds or growth on the right-hand side of the ditch and carry the same away from the ditch. Afterward, when the full length of the ditch has been traversed, the weeds will be left in a row or swath at each side thereof and can be gathered up and burned, or otherwise destroyed. The manner of suspending the cutting mechanism from the main frame permits of adjustment as to height and the character of the cutting members is preferably such that they will pass readily through hills or mounds of earth and serve as levelers.

Should any hard or unyielding obstruction be met with, as, for instance, rocks or boulders, the cutting mechanism is free to move upwardly on account of the manner in which it is suspended from the main frame.

As a modification of the arrangement described in the foregoing, I may utilize the form of blade 13$^a$, such as shown in Fig. 6$^a$, wherein a single edge cutter is disposed in an oblique position forwardly of the propelling mechanism 10$^a$ and is reciprocated laterally to cut the weeds on one side only of the bank. In other words, the cutting member in this form has been divided and the machine is propelled first along one side of the ditch to cut weeds on that side and thereafter is propelled along the other side of the ditch to perform the same operation. This method of operation could be utilized to advantage in cases where the ditch or canal is too wide to straddle and it therefore becomes necessary to operate the machine first on one side and then on the other side.

Having thus described my invention, what I claim and desire to secure by Letters Patent is:

1. An apparatus for trimming weeds and other vegetable growth from the sides of a ditch comprising a carriage to traverse the length of the ditch, a cutter arranged on the carriage in position over the ditch, said cutter being provided with cutting members at opposite sides and means to reciprocate the cutter laterally whereby to cut the weeds first on one side and then on the other, said cutting members being effective to cut only during their movement away from the ditch.

2. An apparatus for trimming weeds and other vegetable growth from the sides of a ditch comprising a carriage to traverse the length of the ditch, a cutter arranged on the carriage in position over the ditch, said cutter being provided with cutting members at opposite sides, means to reciprocate the cutter laterally whereby to cut the weeds first on one side and then on the other, said cutting members being effective to cut only during their movement away from the ditch, and means to cause the weeds to be deposited at each side of the ditch.

3. An apparatus for trimming weeds and other vegetable growth from the sides of a ditch comprising a carriage to traverse the length of the ditch, a cutter arranged on the carriage in position over the ditch, said cutter being provided with cutting members at opposite sides, means to reciprocate the cutter laterally whereby to cut the weeds first on one side and then on the other, said cutting members being effective to cut only during their movement away from the ditch, and means to vary the elevation of the cutter.

4. An apparatus for trimming weeds and other vegetable growth from the sides of a ditch which comprises a carriage to traverse the length of the ditch, a cutter substantially in the form of a forwardly pointed V in plan, both sides of which are provided with cutting edges, and means to reciprocate the cutter laterally whereby to cut the weeds first on one side and then on the other side of the ditch, said cutting edges being effective to cut only during their movement away from the ditch.

5. An apparatus for trimming weeds and other vegetable growth from the sides of a ditch which comprises a carriage to traverse the length of the ditch, a cutter substantially in the form of a forwardly pointed V in plan, both sides of which are provided with cutting edges, means to reciprocate the cutter laterally whereby to cut the weeds first on one side and then on the other side of the ditch, said cutting edges being effective to cut only during their movement away from the ditch, and an upstanding shield on the cutter adjacent each cutting edge to cause the weeds to be carried away from the ditch.

6. An apparatus for trimming weeds and other vegetable growth from the sides of or adjacent to a ditch, which consists of a traveling carriage moving parallel with the ditch, and a reciprocating cutter bar on the carriage movable transversely of the ditch, said bar having a cutting edge obliquely disposed and effective to cut the growth at the side of the ditch only during its outward stroke.

7. An apparatus for trimming weeds and other vegetable growth from the sides of or adjacent to a ditch, which consists of a traveling carriage moving parallel with the ditch, a reciprocating cutter bar on the carriage movable transversely of the ditch, said bar having a cutting edge obliquely disposed and effective to cut the growth at the side of the ditch only during its outward stroke, and means in connection with the cutter bar to deliver the cut growth to the outer limit of movement of the cutter, whereby to permit the same to be dumped at the beginning of the return movement of the cutter.

In testimony whereof I have hereunto set my hand in the presence of two subscribing witnesses.

FLETCHER A. WHITAKER.

Witnesses:
ANNIE J. PEARSON,
IRENE BUGBEE.